Patented Feb. 2, 1943

2,309,860

UNITED STATES PATENT OFFICE 2,309,860

PROTECTION OF INSECTICIDES

Jean Motte, Corbas, and Jean Pomot, Lyon, France; vested in the Alien Property Custodian No Drawing. Application July 19, 1939, Serial No. 285,266. In France July 22, 1938

2 Claims. (Cl. 167—24)

The present invention relates to the protection of organic insecticides against the action of light. It is well known that certain organic insecticides both of vegetable origin and of purely synthetic origin are susceptible to the action of light, and, either partially or totally, lose their insecticidal activity under the effect of sunlight. Amongst the insecticides of vegetable origin rotenone may be specially mentioned.

Rotenone, which is a powerful insecticide, is generally accompanied by other less active toxic principles such as toxicarol, tephrosine and degueline, in a series of plants of the Derris class, Lonchocarpus (cube and timbo) tephrosia. In practice, either the plants themselves ground up and brought to a state of fine powder with or without added substances, or extracts of these plants are used.

It is well known that rotenone, as well as its derivatives, such as dihydrorotenone, and the other above mentioned toxic principles are sensitive to the action of light. An exposure of a few hours to the light of the sun already diminishes the toxicity of these products to insects, and in a few days the insecticide activity has entirely disappeared. It is known that the substances generally added to the powders with a base of rotenone, such as talc, kaolin or infusorial earth, do not overcome the harmful effect of the light in any way.

It has already been proposed to add lamp black to the powders containing rotenone, to protect them from the action of the light. The use of lamp black shows a series of inconveniences; its price is very high; in order that its protection should be efficacious relatively large quantities have to be added and under these conditions the powders acquire an unpleasant black colour difficult to distinguish from the colour of the leaves and vegetables treated with these powders. Actually the good marking and good distribution on the vegetation treated are essential conditions for the treatment to be economic and effective at the same time.

It has since been proved that the rays of the solar spectrum which cause the fall in the toxicity of these products are those of a wave length less than 4,900 A. U. It was then proposed to coat the insecticide grains with a coloured or opaque adhesive solution, which would stop these rays, or with a coloured or opaque coating obtained by the drying of this solution.

It has been found by the applicants, and this is the object of the present invention, that the addition to organic insecticides of certain red mineral pigments finely powdered will assure them an extremely efficacious protection against the action of light without the necessity of any manipulation with adhesive solutions and the possible formation of a coloured impermeable coating by the drying of these solutions coating the grains of the insecticides.

The red mineral pigments which fulfil particularly well the conditions of the invention are the residues of the preparation of alumina known under the name of "red muds."

These red muds are found commercially in the form of very fine powders. Compared with all other products they show a very marked series of advantages. Besides the protection which they assure against the action of light they are distinguished by their great fineness and their great covering power. Their mixtures with insecticide powders, according to the invention, can be composed in such a way as to obtain a "floating power" suitable during the powdering. Their adhesive power to the foliage is remarkable. The colour of the powders which is clearly distinguished from that of the foliage makes clear marking possible and consequently an exact control of the distribution. All these qualities make possible the diminishing in price by the use of a smaller quantity of insecticide.

The red muds can replace the usual additions to insecticide powders wholly or partially. For example a fine powder containing rotenone is mixed with red muds and an inert charge is added, such as talc, in a variable quantity depending on the degree of lightness of the final product which it is desired to obtain.

Naturally the invention is not limited solely to the red muds described above, but extends to all mineral pigments, natural or artificial, of analogous colour and constitution to those of these red muds. There could for example be cited the natural oxides of iron, such as limonite, or the mixtures with clays, the residues of the calcination of different iron salts, etc.

The protection by the said red pigments can be applied not only to the powders obtained by the grinding of insecticide plants but also those obtained by the impregnation of third substances with active vegetable extracts.

The efficaciousness of the protection against the effects of the light appears from the following tests:

A powder containing 3.5% rotenone and other active principles and usual additions and another powder with the same quantity of rotenone and active principles but in which 20% of the additions have been replaced by red muds are prepared. The two powders were exposed in thin layers to the action of the sun and then their toxicity was determined on the larva of doriphore (*Leptinotarsa decemlineata* say).

Before exposure the two powders had such an activity that in three hours 100% of the insects were killed.

After 40 hours exposure, the sample without red mud only showed a toxicity which required 8 hours to kill 30% of the insects and even a more prolonged contact of the powders with the insects did not increase the percentage of the mortality.

The sample with red mud exposed under the same conditions preserved all its toxicity, 100% of the insects being dead in three hours.

After 150 hours exposure the toxicity of the sample without red muds had diminished by 85%.

The toxicity of the sample with red muds likewise exposed for 150 hours on the contrary remained at 100%, the last insect dying after seven hours of contact.

The invention applies not only to the protection of insecticides having a basis of rotenone, but also to other insecticides of vegetable origin which are sensitive to light, such as pyrethrum, nicotine or the like.

Organic insecticides obtained by synthetic processes can also likewise be protected against the destructive action of light by the addition of the above named products. Thus, for example, thiodiphenylamine, which is known as a good insecticide and which rapidly loses its activity by exposure to light, is very effectively protected by the addition of "red muds."

A thiodiphenylamine powder sprinkled immediately after preparation on codling moth is capable of destroying 100% of these insects. The same powder exposed for 8 days to daylight loses almost all its activity and does not kill more than 6% of the insects. If, on the other hand, to 1 part of thiodiphenylamine powder, 4 parts of red mud and 15 parts of inert matter are added, the mortality which is practically 100% before exposure to the light does not fall below 75% after exposure to daylight for 8 days.

All other organic insecticides sensitive to the action of light can be protected in the same way.

What we claim and desire to secure by Letters Patent is:

1. Insecticide preparations containing rotenone characterised by inclusion in the powdery insecticide of finely divided "red muds" obtained as a by-product in the manufacture of alumina.

2. An insecticidal preparation comprising a light-sensitive member of the group consisting of ground rotenone-bearing material, pyrethrum and nicotine-bearing material, admixed with finely divided "red muds" obtained as a by-product in the manufacture of alumina.

JEAN MOTTE.
JEAN POMOT.